| United States Patent [19] | [11] Patent Number: 4,680,320 |
|---|---|
| Uku et al. | [45] Date of Patent: Jul. 14, 1987 |

[54] METHOD FOR PREPARATION OF DROPLETS

[75] Inventors: Kyouji Uku; Shinji Kato, both of Takasago, Japan

[73] Assignee: Kanegafuchi Kagaku Kogyo Kabushiki Kaisha, Osaka, Japan

[21] Appl. No.: 805,523

[22] Filed: Dec. 6, 1985

[30] Foreign Application Priority Data

Dec. 6, 1984 [JP] Japan ................................. 59-258572

[51] Int. Cl.$^4$ ............................................... C08F 2/18
[52] U.S. Cl. .................................. 523/313; 23/293 A; 210/634; 526/88
[58] Field of Search ........................ 526/88; 523/313; 23/293 A; 210/634

[56] References Cited

U.S. PATENT DOCUMENTS 4,444,961 4/1984 Timm ..................................... 521/38
4,487,898 12/1984 Kato ..................................... 526/88

*Primary Examiner*—Paul R. Michl
*Attorney, Agent, or Firm*—Armstrong, Nikaido, Marmelstein & Kubovcik

[57] ABSTRACT

A method of preparing droplets wherein a dispersion phase, insoluble or sparingly soluble in water, is injected in the form of a laminar flow into an aqueous continuous phase through an orifice. The viscosity ratio between the two phases is adjusted to a specific range to produce droplets of uniform diameter at a specified jet velocity.

6 Claims, 1 Drawing Figure

METHOD FOR PREPARATION OF DROPLETS

BACKGROUND OF THE INVENTION

1. Field of the Invention

The present invention relates to a method for preparation of droplets having a uniform size, and more particularly to a method of preparing droplets in a liquid through an orifice without any forced vibration.

2. Description of the Prior Art

Research has heretofore been conducted on methods of preparing droplets wherein a dispersion phase, insoluble or sparingly soluble in an aqueous continuous phase, is injected into the continuous phase through an orifice to form droplets of the dispersion phase having a uniform size, but the droplets obtained have a particle size distribution.

In the method of preparing droplets by injecting an insoluble phase into an aqueous continuous phase in the form of a laminar flow through an orifice, it is known that the diameter of the droplets prepared is dependent on the viscosities, densities and interfacial tension of the two phases.

It is also known that when the velocity of jet of the dispersion phase is controlled to a range slightly lower than the upper limit of laminar flow, the resulting droplets have a particle size distribution of relatively narrow range (Christiansen, R. M. and Hixon, A. N., Ind. Eng. Chem., 49, 1957).

It is further known that the formation of droplets described above closely relates to the phenomenon that when a thread of oil is formed in water by a special method, waves spontaneously occur at the interface and grow into uniformly sized droplets [Taylor, G. I., Proc. Roy. Soc., Ser. A, 146, 501(1934)].

Recently, Kitamura et al. [The Canadian Journal of Chemical Engineering, 60, 723(1982)] report that when a continuous phase is caused to flow coaxially and cocurrently with a jet of dispersion phase from an orifice, with the velocity difference between the two phases reduced at the interface, Taylor waves occur and grow at the interface to form droplets of uniform diameter. Their experiment appears to indicate that when a dispersion phase is injected into a still aqueous continuous phase for the preparation of droplets, the velocity difference between the two phases at the interface presents difficulty in forming droplets of uniform diameter.

On the other hand, Haas [A. I. Ch. E. Journal, 21, 383(1975)] reports that droplets of uniform diameter can be prepared by imparting regular pulsation to a jet of dispersion phase from an orifice to sever the jet at a regular interval.

In the case where such forced vibration is resorted to for preparing droplets of uniform diameter with good stability, it is required to adjust the viscosity of the aqueous phase to not higher than 10 cp and the viscosity of the dispersion phase to about 0.1 to about 10 times the viscosity of the aqueous phase (U.S. Pat. No. 4,444,961).

We have carried out research to obtain droplets of uniform size similarly by forced vibration and found that if the viscosity of the dispersion phase is approximately equal to, or higher than, the viscosity of the aqueous phase, Taylor waves and waves due to forced vibration interfere with each other, making it difficult to produce droplets of uniform size.

On the other hand, when droplets are prepared merely by injecting a dispersion phase into a stationary continuous phase through an orifice, the resulting droplets have a particle size distribution. Uniformly sized droplets can be prepared by the method of Kitamura et al. or of Haas, whereas the method requires too complex an apparatus when to be practiced on an industrial scale.

SUMMARY OF THE INVENTION

It is therefore an object of the present invention to provide a new method of producing mono-dispersed droplets without vibration or special orifice.

Another object of the present invention is to prepare droplets of uniform diameter using a simple apparatus.

The present invention provides a method of preparing droplets in which a water-insoluble dispersion phase to be made into droplets is injected in the form of a laminar flow into an aqueous continuous phase through an orifice, the method being characterized in that the viscosity ratio between the two phases is adjusted to a specified range to produce droplets of uniform diameter at a specific jet velocity.

According to the present invention, the Taylor waves spontaneously occurring at the interface between a thread of liquid and another liquid phase are positively utilized to form droplets of uniform diameter.

The diameter of the droplets obtained is determined by the wavelength of the Taylor wave and is about two times the diameter of the orifice.

The method of the present invention is therefore applicable to processes wherein droplets of uniform diameter are required. Spherical particles of uniform diameter can be obtained by solidifying the droplets prepared by the method of the invention.

DETAILED DESCRIPTION OF THE INVENTION

Figure 1:
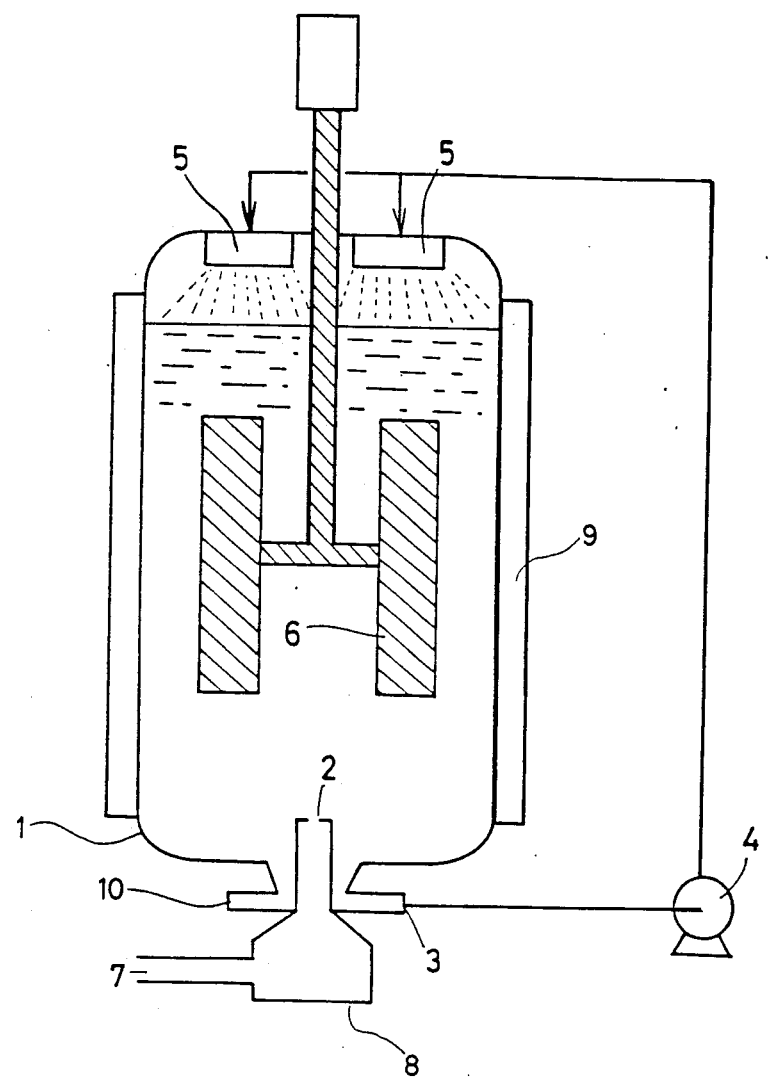
FIG. 1 is a diagram showing an apparatus used in Example 3.

The present invention provides a method of preparing droplets wherein a dispersion phase, insoluble or sparingly soluble in an aqueous continuous phase, is injected through an orifice in the form of a laminar flow into the continuous phase in stationary state, the method being so adapted that when the viscosity of the dispersion phase is $\mu'$, and the viscosity of the aqueous continuous phase is $\mu$, the viscosity ratio $\mu'/\mu$ is adjusted to the range of from 0.9 to 4, whereby droplets having a uniform diameter can be produced.

In the course of research leading to the present invention, we conducted experiments directing attention to the droplet forming mechanism. Consequently, we found that when the viscosity ratio $\mu'/\mu$ is smaller than 0.9, the jet breaks into droplets randomly although regular waves occur at the interface between the two phases. We also found that when the viscosity ratio $\mu'/\mu$ is 0.9 to 4, regular waves occur and grow at the interface, causing the jet to break into droplets regularly. We further found that when the viscosity ratio $\mu'/\mu$ is greater than 4, droplets join together immediately before they break off the jet although regular waves occurring at the interface grow. While droplets of uniform diameter can be obtained only when the velocity of jet of the dispersion phase is in a certain range, the viscosity ratio $\mu'/\mu$ of 1.5 to 3 was found desirable for the droplet preparation procedure because the velocity range is then wider.

When the method of the present invention is applicable to a laminar flow of dispersion phase having a jet velocity, the Reynolds number of the dispersion phase passing through an orifice must fulfill at least the following requirement:

$$10 \times dn^{0.4} \times \eta^{-1} < Re < 20 \times dn^{0.4} \times \eta^{-1} \quad (1)$$

wherein dn (cm) is the diameter of the orifice, $\eta$ (cm$^2$/sec) is the kinematic viscosity of the dispersion phase, and Re is the Reynolds number which is defined by:

$$Re = dnU/\eta$$

wherein U (cm/sec) is the average jet velocity of the dispersion phase passing through the orifice. The expression (1) was determined when the density difference between the aqueous continuous phase and the dispersion phase is about 0.1 to about 0.2 (g/cm$^3$), and the aqueous continuous phase has a viscosity of up to about 5 (cp).

The diameter of droplets prepared by the method of the present invention is dependent on the wavelength of the Taylor wave as already stated.

The research by Kitamura reveals that under the condition involving no velocity difference at the jet interface, the diameter of droplets to be formed is determined by the wavelength of Taylor waves and is about 1.9 to about 2 times the orifice diameter.

With the method of the present invention, a dispersion phase is injected into a stationary aqueous continuous phase, with a velocity difference at the interface between the two phases, so that the diameter of droplets formed was about 2 to 2.2 times the orifice diameter.

The viscosity ratio between the two phases can be adjusted easily by varying the viscosity of either phase, for example, by dissolving a water-soluble substance in the aqueous continuous phase to increase the viscosity of the continuous phase, or by dissolving an oil-soluble solute in the dispersion phase to vary the viscosity of the dispersion phase. If the viscosity of either phase has high temperature dependence, the viscosity ratio is adjustable also by altering the temperature of the system.

We conducted experiments for preparing droplets using various combinations of aqueous continuous phases and dispersion phases, which include, for example, preparation of kerosene droplets in water. In this case, the viscosity ratio $\mu'/\mu$ was within the range of from 0.9 to 4 from the start, so that droplets of uniform diameter were obtained without adjusting the viscosity ratio. Accordingly, the present invention is useful for application to systems wherein the viscosity ratio $\mu'/\mu$ of the two phases is not within the range of 0.9 to 4 before adjustment.

The method of the present invention is usable for apparatus, such as particle forming apparatus and extraction apparatus, in which droplets of uniform diameter are required as already mentioned, while the method is useful also for the following applications.

When polymer particles are to be prepared by suspension polymerization, it is desirable to obtain particles of uniform diameter. In such a case, monomer droplets of uniform diameter are prepared first and then polymerized, whereby uniformly sized polymer particles can be obtained. The monomers to be used include, for example, styrene, $\alpha$-methylstyrene, chlorostyrene, acrylonitrile, methyl acrylate, etc. The viscosity ratio between two phases is adjustable by dissolving a polymer of one or at least two of such monomers in the monomer or in a mixture of the monomers. The viscosity ratio is adjustable also by partially polymerizing the monomer in advance.

Further when an ion exchange resin is to be prepared, divinylbenzene or like crosslinking agent, or a monomer having at least two functional groups may be dissolved in the dispersion phase in advance.

The method of the present invention is usable also for particle forming processes, because the particles prepared, if uniformly sized, generally have an increased commercial value. In such a case, particles of uniform diameter can be obtained by supplying uniformly sized droplets of dispersion phase to an aqueous continuous phase using the present method, followed by a known encapsulating technique for the preparation of particles.

From the viewpoint of controlling the flux of components in extraction processes, the area of liquid-liquid interface, if settable to the desired value, will make it possible to design an efficient apparatus and to set an optimum operating conditions. The liquid-liquid interface area is settable easily as desired by supplying uniformly sized droplets of a dispersion phase to an aqueous continuous phase by the method of the invention.

As described in detail above, the method of the present invention has the advantage that uniformly sized droplets can be obtained easily with a sharp diameter distribution without using any complex apparatus.

Hereinbelow the invention will be described in more detail by way of example that follow, to which examples the invention should not be construed to be limited.

EXAMPLE 1

A glass column, 12 cm in diameter, was used which was provided at its bottom with an orifice plate of stainless steel having a thickness of 1 mm and formed with an orifice with a diameter of 0.08 cm. With the glass column filled with deionized water, styrene monomer or a solution of polystyrene in styrene monomer was injected into the glass column vertically upward through the orifice, and the formation of droplets was observed. This procedure was repeated at varying flow rates and at varying polystyrene concentrations.

Table 1 shows the results.

"Uniform" in the column of "droplets formed" in Table 1 means that droplets being formed were observable in stationary state in synchronism by a stroboscope flashing light at a certain frequency. Synchronism was achieved at 100 to 200 Hz in this experiment.

The droplets of uniform diameter were produced only when the flow rate v (cc/min) of the dispersion phase was in the range listed in Table 1.

TABLE 1

| | | | Experimental Results | | | |
|---|---|---|---|---|---|---|
| Run No. | Polystyrene concn. (wt. %) | Temp. (°C.) | Viscosity ratio $\mu'/\mu$ | Droplets formed | Flow rate v (cc/min) | Diam. of droplets dp (cm) |
| 1-1 | 0 | 20 | 0.75 | Uneven | — | — |
| 1-2 | 0.21 | 17 | 0.88 | " | — | — |

TABLE 1-continued

| Run No. | Polystyrene concn. (wt. %) | Temp. (°C.) | Viscosity ratio $\mu'/\mu$ | Droplets formed | Flow rate v (cc/min) | Diam. of droplets dp (cm) |
| --- | --- | --- | --- | --- | --- | --- |
| 1-3 | 0.4 | 15 | 0.92 | Uniform | 19.6–20.5 | 0.175 |
| 1-4 | 0.83 | 12 | 1.03 | " | 19.3–20.0 | 0.17 |
| 1-5 | 1.5 | 12 | 1.40 | " | 17.8–21.1 | 0.165 |
| 1-6 | 2.5 | 15 | 2.39 | " | 19.3–24.7 | 0.155 |
| 1-7 | 2.7 | 35 | 3.33 | " | 18.4–20.2 | 0.155 |
| 1-8 | 3.5 | 34 | 4.05 | Uneven | — | — |
| 1-9 | 5.0 | 33 | 6.67 | " | — | — |

EXAMPLE 2

The same glass column as used in Example 1 was used except that the stainless steel orifice plate was formed with an orifice having a diameter of 0.02 cm and a depth of 0.1 cm. Droplets of kerosene were produced in the aqueous continuous phase listed in Table 2 at a temperature of 30° C.

With Run No. 2-1, kerosene was injected into water, giving droplets with a uniform diameter of 0.042 cm when the flow rate of the dispersion phase was in the range listed in Table 2.

With Run 2-2, the viscosity ratio $\mu'/\mu$ was reduced to below 0.9 by increasing the viscosity of the continuous phase with glycerin. Even if the flow rate of the dispersion phase was altered, no uniformly sized droplets were formed.

TABLE 2

|  | Run No. 2-1 | Run No. 2-2 |
| --- | --- | --- |
| Dispersion phase | Kerosene | Kerosene |
| Continuous phase | Deionized water | 30 Wt. % aq. glycerin soln. |
| Viscosity ratio $\mu'/\mu$ | 1.18 | 0.49 |
| Droplets formed | Uniform | Uneven |
| Flow rate v (cc/min) | 3.1–3.4 | — |

EXAMPLE 3

FIG. 1 shows the apparatus used and comprising a reactor 1 having an inside diameter of 130 mm and a height of 400 mm. Three liters of an aqueous dispersion medium containing 1000 ppm of finely divided calcium phosphate, 80 ppm of polyvinyl alcohol and 80 ppm of an anionic surfactant was charged into the reactor 1, then drawn off via a medium outlet 3 having an inside diameter of 8 mm and provided at the bottom of the reactor 1, thereafter fed by a centrifugal pump 4 at a flow rate of 4 liters/hr. to a dispersing device 5 disposed at the top of the reactor and having a large number of orifices with a diameter of 0.5 mm, and thereby sprinkled over the entire surface of the dispersion medium within the reactor. Thus, the medium was circulated through the system. The medium had a temperature of 10° C.

Next, a solution of 1.5 wt. % of polystyrene and 0.3 wt. % of benzoyl peroxide in styrene monomer was introduced into a droplet forming device 8 via a monomer inlet 7 and injected at a rate of 20 cc/min into the aqueous dispersion medium within the reactor 1 through an orifice plate 2 having an orifice with a diameter of 0.8 mm to prepare droplets of uniform diameter.

The monomer was fed at a temperature of 10° C., and the viscosity ratio $\mu'/\mu$ between the two phases was 1.4 at this temperature.

The monomer was supplied in an amount of 500 g, whereupon preparation of droplets was discontinued, hot water was passed through a jacket 9 to maintain the interior of the reactor at a temperature of 90° C., and the monomer was polymerized for 2 hours. Until this time, a stirrer 6 within the reactor 1 was held out of rotation, permitting the droplets to be suspended in the form of a fluidized bed within the reactor 1.

The pump 4 was then stopped, and the stirrer 6 having flat blades, 80 mm in width and 200 mm in length, was rotated at 60 r.p.m. for continued polymerization at 90° C. for 3 hours.

The resulting slurry containing polymer particles was withdrawn from a slurry outlet 10, dewatered, dried and thereafter checked for particle size distribution. Consequently, uniformly sized, precisely spherical polymer particles were obtained with a mean diameter of 1.5 mm in a yield of 98% for 10- to 12-mesh particles.

What we claim is:

1. A method of preparing droplets without forced vibration wherein a dispersion phase insoluble or sparingly soluble in an aqueous continuous phase is injected in the form of a laminar flow into the continuous phase through an orifice, the method being characterized in that when the viscosity of the dispersion phase is $\mu'$ and the viscosity of the continuous phase is $\mu$, the viscosity ratio $\mu'/\mu$ between the two phases is adjusted to the range of from 0.9 to 4 to produce droplets having a uniform diameter without using forced vibration.

2. A method as defined in claim 1 wherein the dispersion phase is a monomer or a solution of the monomer in a solvent, and the monomer or the solution has dissolved therein a polymer of the monomer or other polymer to adjust the viscosity ratio.

3. A method as defined in claim 1 wherein the jet velocity of the dispersion phase has a Reynolds number Re in the range of the expression (1)

$$10 \times dn^{0.4} \times \eta^{-1} < Re < 20 \times dn^{0.4} \times \eta^{-1} \tag{1}$$

wherein dn (cm) is the diameter of the orifice, and $\eta$ (cm²/sec) is the kinematic viscosity of the dispersion phase.

4. A method as defined in claim 2 wherein the dispersion phase contains styrene monomer.

5. A method as defined in claim 2 wherein the dispersion phase contains styrene monomer, and the polymer added for adjusting the viscosity ratio is polystyrene.

6. A method as defined in claim 1 wherein the viscosity ratio $\mu'/\mu$ between the two phases is in the range of from 1.5 to 3.

* * * * *